(12) United States Patent
Howe (10) Patent No.: US 10,142,361 B2
(45) Date of Patent: Nov. 27, 2018

(54) LOGIN CREDENTIAL ALERT SYSTEM

(71) Applicant: VISA INTERNATIONAL SERVICE ASSOCIATION, San Francisco, CA (US)

(72) Inventor: Justin Xavier Howe, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 15/364,536

(22) Filed: Nov. 30, 2016

(65) Prior Publication Data

US 2017/0155675 A1 Jun. 1, 2017

Related U.S. Application Data

(60) Provisional application No. 62/261,235, filed on Nov. 30, 2015.

(51) Int. Cl.
*G06F 11/00* (2006.01)
*H04L 29/06* (2006.01)
*G06F 17/30* (2006.01)

(52) U.S. Cl.
CPC .... *H04L 63/1425* (2013.01); *G06F 17/30867* (2013.01); *H04L 63/0428* (2013.01)

(58) Field of Classification Search
CPC ........... G06F 17/30867; H04L 63/0428; H04L 63/1425; H04L 63/06; H04L 63/083
See application file for complete search history.

(56) References Cited

U.S. PATENT DOCUMENTS 9,716,724 B1 * 7/2017 Chennuru ........... H04L 63/1433
2014/0046728 A1 * 2/2014 Tryfon ............... G06Q 30/0203
705/7.32

\* cited by examiner

*Primary Examiner* — Abiy Getachew
(74) *Attorney, Agent, or Firm* — Kilpatrick Townsend & Stockton LLP (57) ABSTRACT

Embodiments of the present invention are directed at system and method that notify users and/or organizations when login credentials are potentially compromised. The login credentials may be compromised at a first organization and the alert may be sent to different organizations at which the same login credentials are used. The different organizations can request password resets and heightened authentication measures.

20 Claims, 4 Drawing Sheets

LOGIN CREDENTIAL ALERT SYSTEM

CROSS-REFERENCE TO RELATED APPLICATIONS

This application is a non-provisional application of and claims the benefit of the filing date of U.S. Provisional Application No. 62/261,235, filed on Nov. 30, 2015, which is herein incorporated by reference in its entirety for all purposes.

BACKGROUND

Most merchant, issuer, and third party computers require usernames and passwords to access data, and most systems use a username that is easily identifiable for the user (e.g., an email address). These individual organizations can store the username and password login credentials internally, in a cloud storage computer, and/or in an internet traffic monitoring computer.

As passwords become more complex (e.g., capital/lowercase letters, numbers, symbols, minimum number of characters, etc.), users may be tempted to reuse the passwords across various organizations. This can create identical username and password credentials across multiple systems hosted by different organizations.

When such organizations become targets for hackers and other malicious third parties, users' credentials may be compromised. For example, a hacker can compromise a merchant's backend computer system to access a customer database, including usernames and a hashed list of passwords. In another example, a hacker can compromise a merchant's frontend computer system to access usernames and passwords as they are entered by users. In yet another example, a phisher can convince a user to enter username and password details in a third party webpage that looks similar to the merchant's webpage. The phisher may try those same credentials with other issuers, merchants, and third party computers in hopes that the user repeated their login credentials across multiple organization computers.

Thus, despite the best efforts of such organizations, users' data can be compromised in multiple locations across multiple organizations, even when those organizations did not experience a data breach.

Embodiments of the invention address these and other problems, individually and collectively.

BRIEF SUMMARY

Embodiments are directed to a system and method that notifies users and/or organizations when login credentials are potentially compromised. The login credentials may be compromised for one organization and the alert may be sent to other organizations that may also be affected. The alert allows these other organizations to request password resets and heightened authentication measures for potentially compromised accounts. This alert process may be implemented by a transaction processor in cooperation with an internet traffic monitoring service provider. For example, the transaction processor may communicate with several organizations such as merchants and issuers on a regular basis through transaction processing. The alert communication from the transaction processor would include information about a potentially compromised account. The organizations (e.g., issuer computer, etc.) can trust the source of the alert message from the transaction processing computer. For example, organizations such as merchants and issuers may already have an existing anti-fraud relationship with the transaction processor. As such, the alert process does not require establishing a new communication channel or relationship with an internet traffic monitoring computer. Additionally, the internet traffic monitoring computer might not be able to implement or be interested in fraud reporting.

Accordingly, embodiments result in higher protection for users' data by notifying users quickly when there is a security breach at an organization that may store the user's personal data in association with a username/password, and may inform the user to increase protection measures at other organizations as well, especially when a similar username/password is used to access data stored at those other organizations. Thus, embodiments increase data security. Additionally, fewer security resources are necessary to implement the increased security measures (e.g., by using existing computer systems implemented with the transaction computer (TPN), etc.).

One embodiment of the present invention is directed to a method. The method includes a first computer receiving a username associated with a data breach at a first organization, searching a database comprising previously received usernames from a plurality of organizations, and identifying a second organization from the plurality of organizations at which the compromised username is also used. The first computer can encrypt an alert using an encryption key, and then transmit the encrypted alert to a second computer associated with the second organization, in which the encrypted alert indicates that the username used at the second organization has been compromised. In some embodiments, the first computer is an internet traffic monitoring computer or a transaction processing network computer. The compromised username and identity of the second organization can be received from an internet traffic monitoring computer.

Other embodiments include systems, computer-readable media, and apparatuses for performing the method described above.

DETAILED DESCRIPTION

Embodiments are directed to a system and method that notifies users and/or organizations when login credentials are potentially compromised at one organization, so that these users and/or organizations can request password resets and heightened authentication measures. This alert process may be implemented by a transaction computer (or transaction processing computer, or transaction processing network (TPN), used interchangeably) associated with a transaction processor, in cooperation with an internet traffic monitoring computer associated with an internet traffic monitoring service provider. For example, the transaction computer may communicate with several of these organizations on a regular basis through transaction processing and may already have an existing anti-fraud relationship with these entities. When the internet traffic monitoring service detects a security breach at one organization, the internet traffic monitoring service can inform the transaction processor, and the transaction processor can send an alert to other organizations at which users of the compromised entity may also have an account with. The alert communication from the transaction computer may include information about a potentially compromised account. The organizations (e.g., issuer computer, etc.) can trust the source of the alert since it is coming from a transaction processor that has an existing anti-fraud relationship, and the process does not require a new relationship to be established with the internet traffic monitoring service provider. Embodiments result in higher protection for users' data by notifying users quickly when there is a security breach. Thus, embodiments increase data security. Additionally, fewer security resources may be necessary to implement the increased security measures.

As a sample illustration, the user may provide a username (John.Doe@email.com) and password (Pa55word!) to login at a uniform resource locator (URL) associated with Acme Co. (www.acmeco.com/login). The user may provide the same username and password to login at a URL associated with Beta Brand (www.betabrand.com/login). A hacker may breach Acme Co. and steal the username and password for all users associated with Acme Co., and may attempt to gain access to the user's data at Beta Brand using the stolen Acme Co. data by assuming that the user uses the same login credentials for both organizations.

To prevent this additional data breach at Beta Brand in this example, an alert may be transmitted from Acme Co. to an internet traffic monitoring computer regarding the breach (e.g., directly to the internet traffic monitoring computer or through an intermediary computer system, including a transaction computer). The internet traffic monitoring computer can determine that the user uses the same username at Beta Brand. The internet traffic monitoring computer may generate a file that includes the username and one or more organization computers who may be affected by the compromised data and send the file to the transaction computer and/or directly to the organizations. The organizations can take remediation actions to help secure the user's data (e.g., require password reset, heightened authentication measures, etc.).

There are several advantages to allowing the transaction computer to provide the alert directly to the organizations. For example, the organizations can receive the alert from a source that has an existing communication channel (e.g., known communication ports or application programming interfaces (API), etc.) and/or anti-fraud relationship. Merchant computers may be required to notify an acquirer computer or similar organization computer of a data breach, but not be obligated to notify the internet traffic monitoring computer. Additionally, the internet traffic monitoring computer may not have access to worldwide fraud reporting.

There are several technical improvements. For example, data security is improved by alerting organizations prior to a data breach. The minimum level of security is increased by comparing the username and/or other credentials across multiple organizations, where those organizations would not otherwise be able to check for similar credentials across these multiple organizations. The data would not be shared amongst these organizations, that typically compete with each other or have privacy agreements with their users. In some examples, the internet traffic monitoring computer is located remotely from these organizations and can perform the comparison using data that is received multiple organizations, either actively receiving a file or passively by monitoring internet traffic.

In some examples, the data are received in an encrypted form, but decrypted by the internet traffic monitoring computer to send to the recipient (e.g., with approval from the recipient). The internet traffic monitoring computer can compare the decrypted username data with other decrypted usernames, as an additional step to other internet traffic monitoring that may be performed by the internet traffic monitoring computer. The internet traffic monitoring computer may compare the decrypted username with other decrypted usernames that the internet traffic monitoring computer receives from other organizations to improve overall data security.

Figure 1:
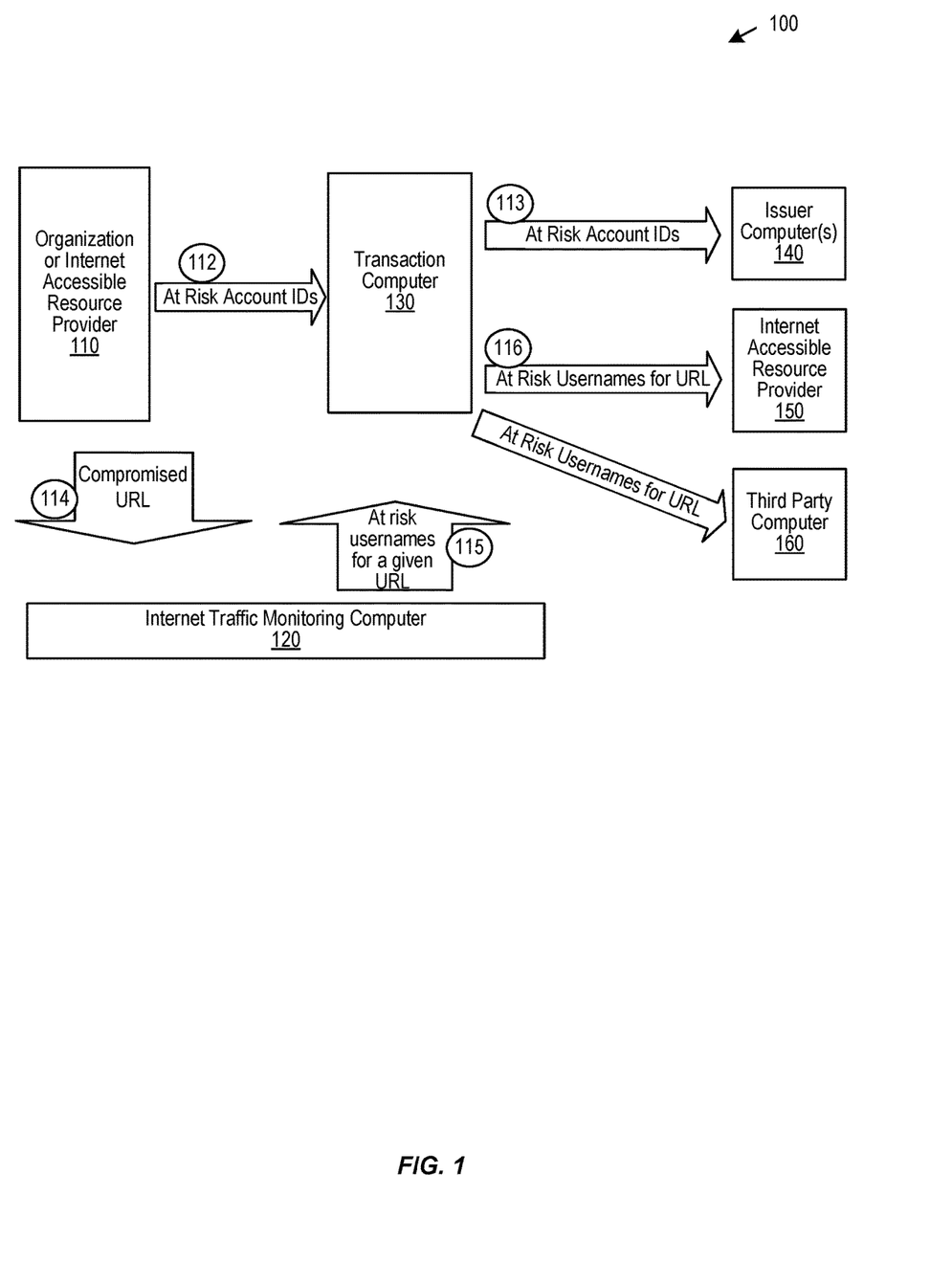
FIG. 1 shows a block diagram of an alert system, according to embodiments of the present invention.

FIG. 1 shows an exemplary block diagram of an alert system including an organization or other internet accessible resource provider 110 (used interchangeably) (e.g., merchant, etc.), transaction computer 130, internet traffic monitoring computer 120, and one or more internet accessible resource providers 150, issuer 140, and third party computers 160, according to embodiments of the present invention. The system includes a user who may operate a user device (e.g., mobile device, smart phone, mobile phone, tablet, netbook, laptop, or any other suitable mobile computing device. etc.). The user may operate the device to access one or more organizations' computers. Additional details of the internet traffic monitoring computer 120 are provided with FIG. 3 and additional details of the transaction computer 130 are provided with FIG. 4.

The organizations' computers or other internet accessible resource provider 110, internet traffic monitoring computer 120, and/or transaction computer 130 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The organizations' computers or other internet accessible resource provider 110, internet traffic monitoring computer 120, and/or transaction computer 130 may use any suitable wired or wireless network, including the Internet.

The internet traffic monitoring computer 120 may comprise a stand-alone organization and/or an entity within a larger organization, each of which may monitor network traffic. In some examples, the internet traffic monitoring computer 120 may include a pass-through computer that receives data from internet traffic, or an internet service provider (ISP) that can access and/or provide access to one or more networks, including the Internet. In some examples, the internet traffic monitoring computer 120 may be operated by an email provider (e.g., that processes email data for one or more users, that provides a service to provide email on behalf of an email provider, etc.), a shipping company, or encryption key escrow service computer or key archive service computer (e.g., that stores one or more encryption keys for one or more users, etc.).

The user may provide a username and password to each of the organizations' computers or other internet accessible resource provider 110 to access data associated with the user's account at the organization. For example, the organization may provide banking services for the user. The user may provide their email address as a username and a password that complies with the organization's requirements for a password (e.g., capital/lowercase letters, numbers, symbols, minimum number of characters, etc.). The user may use their device to access a second organization as well. The user can provide their email address as a username and a password that complies with the organization's requirements for a password (e.g., capital/lowercase letters, numbers, symbols, minimum number of characters, etc.). These usernames and/or passwords may be the same.

The username and/or password may be compromised at the first organization or other internet accessible resource provider 110. The compromised organization or other internet accessible resource provider 110 may identify a security breach and/or notify a transaction computer 130 regarding the compromised information. The compromised organization may identify a security breach of the account identifier(s) and/or notify the transaction computer 130 (e.g., and/or other computers that may notify the transaction computer indirectly).

One or more alerts may be transmitted after the security breach. For example, at 112, the first organization or other internet accessible resource provider 110 may transmit an alert that includes account identifiers (e.g., Primary Account Numbers (PAN), etc.) of payment instruments used at the compromised organization. The alert may be received through a compromised account management system at the transaction computer 130. The transaction computer 130 receives the alert of the compromised account data.

At 113, the transaction computer 130 transmits a notification to one or more other computers that correspond with the account(s). For example, the alert may include an account identifier associated with the security breach of an account issued by an issuer. The transaction computer 130 can identify the issuer computer 140 associated with the account identifier and transmit the alert to the corresponding issuer computer 140.

The one or more other computers can receive the alert of the compromised account identifier. Continuing the illustration, after receiving the alert of the compromised account identifier, the issuer computer 140 may take one or more remediation actions (e.g., issuing a new account identifier, requiring a heightened authentication for the user, resetting the password, etc.).

Other alerts may be transmitted as well, including alerts regarding compromised usernames and/or passwords. These other alerts may be in addition to the alerts that notify issuer computers 140 of compromised account identifiers. In some examples, these alerts regarding compromised usernames and/or passwords may be the only alerts that are provided to issuer computers 140 without also notifying the issuer computers 140 of compromised account identifiers.

At 114, in a different process than the process described with respect to steps 112, 113, 116, one or more alerts may be generated and transmitted by the first organization or other internet accessible resource provider 110. These alert(s) may correspond with compromised usernames and/or passwords. The alert may comprise the username and/or a list of usernames that are compromised, the user associated with the username, password, phone number (e.g., to transmit an alert directly to the user, etc.), email address, email aliases of the user, and the like.

The alert may be transmitted to an internet traffic monitoring computer 120, which may receive the notification about the compromised information. The internet traffic monitoring computer 120 can be notified of the security breach at the compromised organization 110 through receipt of the alert. The alert may include a URL or an identifier of the organization associated with the data breach, and the affected usernames and/or passwords.

The internet traffic monitoring computer 120 can identify one or more other organizations that may have accounts with the same usernames and/or passwords. This can be done by searching a database for those accounts. The internet traffic monitoring computer 120 may generate a file of compromised usernames and/or passwords. The file may include a username (e.g., John.Doe@email.com) and a list of organizations where that username is used to access user data (e.g., Acme Co., Beta Brand, etc.). The organizations may include merchants, email providers, academic institutions, financial services, third party computers, and the like.

The file may include an email, organization, and/or phone number, for example:

John.Doe@email.com; Acme Co.; 555-1234
John.Doe@email.com; Beta Brand; 555-1234

Note that before the identification of the one or more accounts with the same usernames and/or passwords, the internet traffic monitoring computer 120 may collect and store information about the usernames and passwords used by a user as communications pass between and the user's computer and various computers such as an issuer computer 140, an internet accessible resource provider 150 (e.g., an online merchant computer), or other third party computer 160.

At 115, the internet traffic monitoring computer 120 may transmit the file (e.g., comprising the compromised usernames, etc.) to the transaction computer 130. In some examples, the internet traffic monitoring computer 120 may be unaware of the passwords and may assume that the passwords may potentially be reused at different organizations.

At 116, the transaction computer 130 may transmit an alert to the organization(s) where the username is reused, including an issuer computer 140, an internet accessible resource provider 150, or other third party computer 160. These organizations may correspond with one or more URLs. For example, the data breach may have occurred at one URL, and the alert is sent to organizations with URLs that is different from the URL of the compromised organization.

In some embodiments, the transaction computer 130 may transmit an alert to issuer computer 140 when an account identifier is compromised and a second alert to the issuer computer 140 when a username/password is compromised. The alerts may be combined or separate. When the organizations receive the alert, the organizations can require the user to change the password, account identifier, and/or take other actions to help ensure data security.

Figure 2:
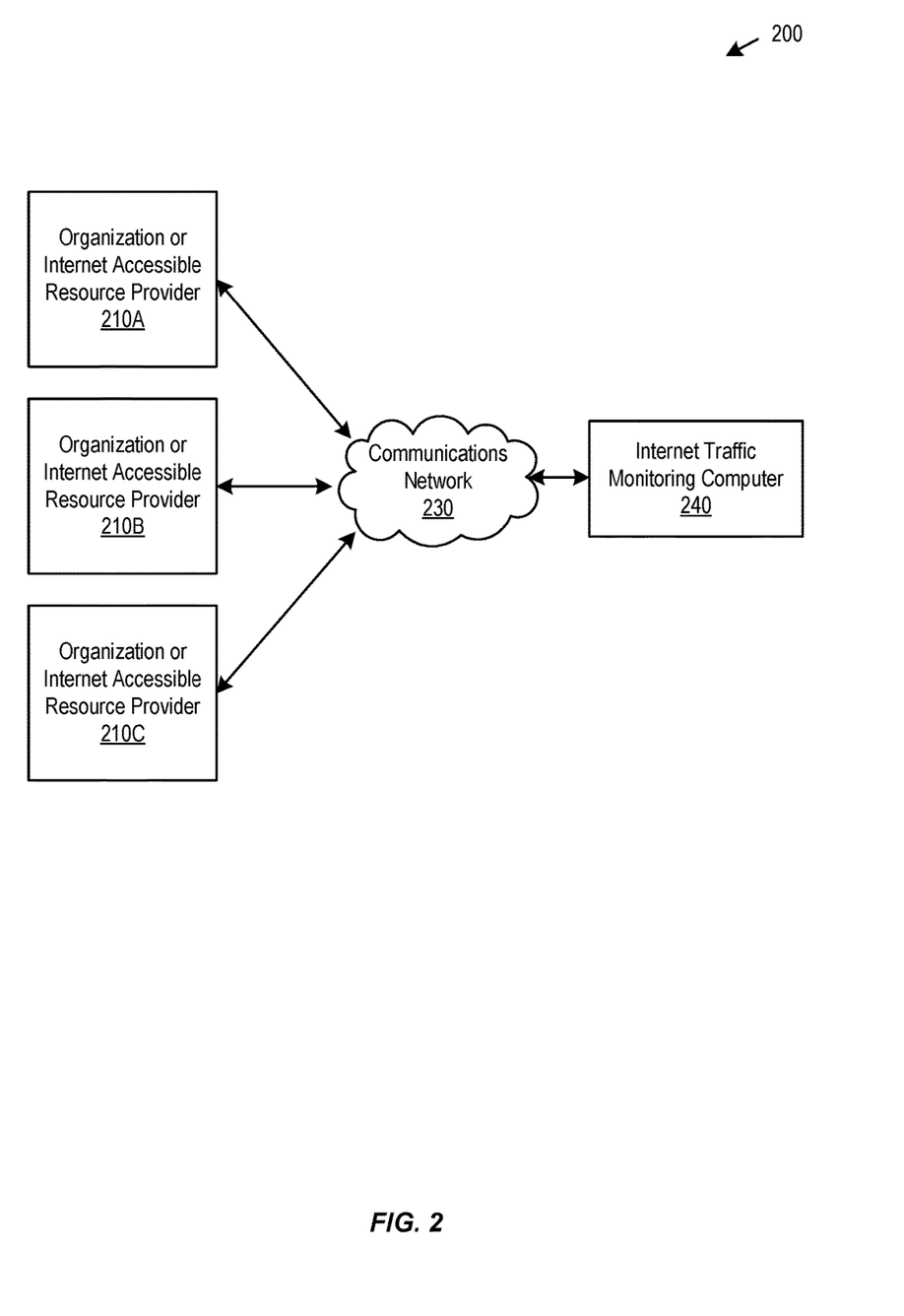
FIG. 2 shows an alternative block diagram of an alert system, according to embodiments of the present invention.

FIG. 2 shows an alternative block diagram of an alert system where a transaction computer may not be implemented (e.g., only the compromised organization 110 and an internet traffic monitoring computer 120, etc.). The system 200 comprises one or more organizations or internet accessible resource providers 210 (illustrated as internet accessible resource provider 210A, 210B, and 210C). The organizations or internet accessible resource providers 210 communicate through a communications network 230 with an internet traffic monitoring computer 240. In comparison to FIG. 1, a transaction computer may not be implemented (e.g., the internet traffic monitoring computer 240 may communicate with an issuer 140, internet accessible resource provider 150, and/or third party computer 160 directly, etc.). Additional details of the internet traffic monitoring computer 240 are provided with FIG. 3.

In some examples, the internet accessible resource providers 210 may alert the internet traffic monitoring computer 240 of data breach at a particular organization. The internet accessible resource providers 210 may supply one or more resources for users (e.g., using the internet accessible resource provider 210, merchants, etc.).

In some examples, the internet accessible resource providers 210 may not actively provide the alert to the internet traffic monitoring computer 240 of the data breach, but rather the internet traffic monitoring computer 240 may identify a data breach by monitoring internet traffic to and from the internet accessible resource providers 210. In some examples, the internet accessible resource providers 210 may be required by law to report any data breach (e.g., to users, to a governing organization, to the transaction computer 130, etc.).

Figure 3:
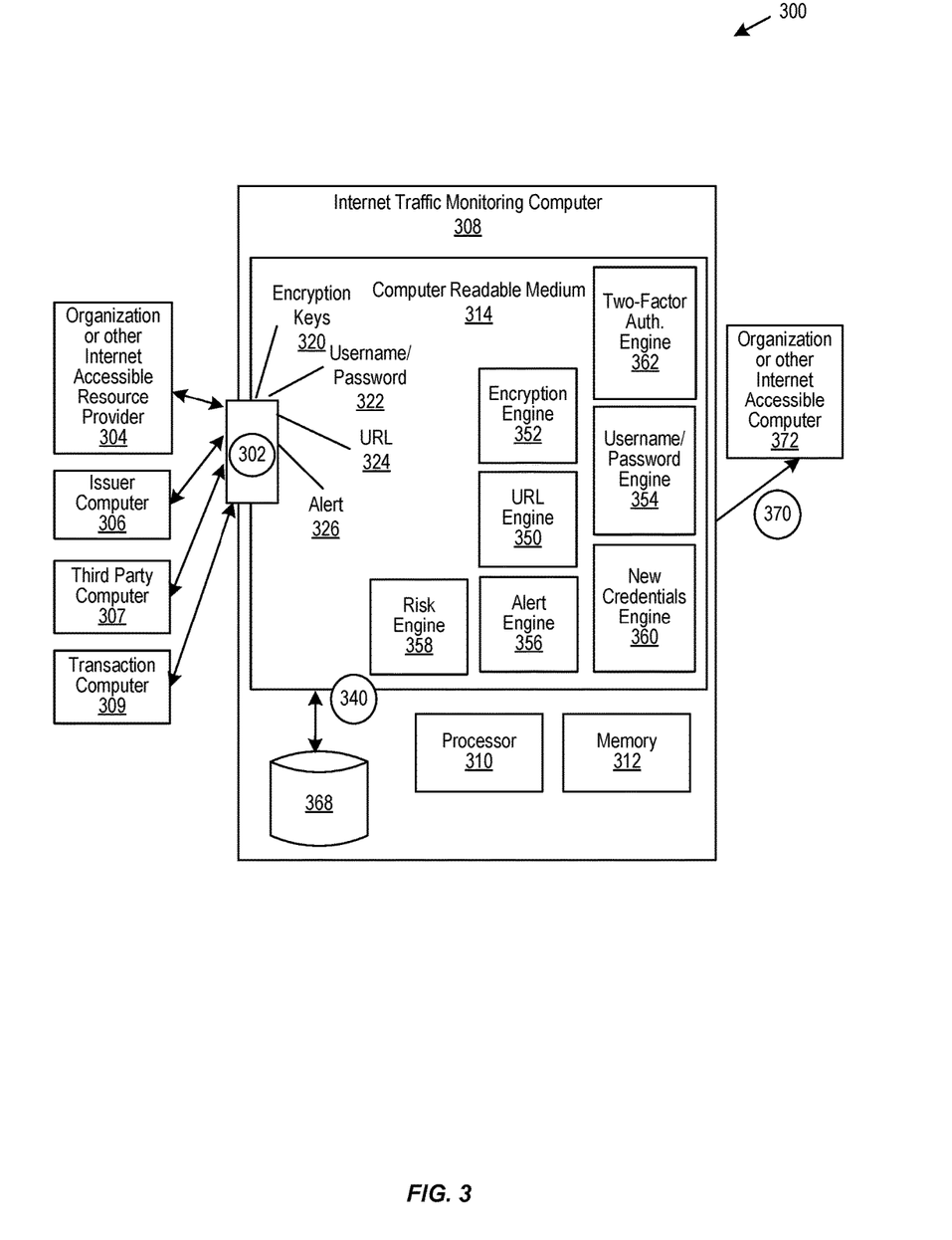
FIG. 3 shows an exemplary block and flow diagram of an internet traffic monitoring computer, according to one embodiment of the present invention.

FIG. 3 shows an exemplary block and flow diagram of an internet traffic monitoring computer, according to one embodiment of the present invention. FIG. 3 illustrates additional details of the internet traffic monitoring computer 120 from FIG. 1. The internet traffic monitoring computer 308 may be a specialized computer configured to perform the methods described herein. The internet traffic monitoring computer 308 may comprise a processor 310, memory 312, and computer readable media 314.

At 302, the internet traffic monitoring computer 308 may receive and/or process data sent over a network such as the Internet, an internet, or an intranet. The data may include usernames and passwords sent between users and various computers operated by organizations that provide services over the internet, including the transaction computer 309, issuer computer 306, organization or other internet accessible resource provider 304, third party computer 307, and the like.

In some embodiments, the data sent to or from the internet traffic monitoring computer 308 can be protected by a secure communication protocol such as HTTPS, which may use encryption techniques such as secure sockets layer (SSL), transport layer security (TLS), etc. to encrypt the data transmission. For example, the internet traffic monitoring computer 308 may act as a SSL/TLS proxy, and perform a handshake with any of the various computers to establish encryption keys 320 (e.g., session keys) that are used to encrypt data transmitted between the internet traffic monitoring computer 308 and the various computers. As such, the username and password need not be sent in the clear to or from the internet traffic monitoring computer 308. Instead, the username and password can be transmitted in an encrypted form to the internet traffic monitoring computer 308 to avoid the username and password from being compromised. Upon receiving the encrypted data, the internet traffic monitoring computer 308 can decrypt the data using the appropriate encryption key 320 and process the username and password.

Thereafter, the internet traffic monitoring computer 308 can re-encrypt the username and password using an encryption key established between the internet traffic monitoring computer 308 and the final destination, and forward the encrypted username and password to their final destination.

While any suitable key distribution process can be used, in some embodiments, the internet traffic monitoring computer 308 may generate a public/private key pair, and may transmit the public key to the computers 304, 306, 307, 309 372. Each of the computers 304, 306, 307, 309, 372 may then generate symmetric session keys, and one of those keys may be encrypted with the public key. The encrypted session key is then transmitted by the computers 304, 306, 307, 309, 372 to the internet traffic monitoring computer 308. The symmetric keys may then be used to encrypt and decrypt communications between the internet traffic monitoring computer 308 and each of the other computers 304, 306, 307, 309, 372.

As discussed above, the internet traffic monitoring computer 308 may receive a username/password 322 associated with one or more organization computers. By way of example, the internet traffic monitoring computer 308 may receive the username and/or password 322 as an internet service provider. In this role, the internet traffic monitoring computer 308 may provide users with access to the Internet or other network, where the user may submit the username and/or password 322 to an organization to login to the organization's website. The internet traffic monitoring computer 308 may receive the username and/or password 322 as an intermediary between the user and the organization. The username and/or password 322 may be processed by the username/password engine 354 and/or stored with a corresponding database 368. In some embodiments, the username/password 322 may correspond with a particular URL but may not be unique to the URL.

The internet traffic monitoring computer 308 may receive a URL 324 and/or identification of an organization at which a data breach has occurred. As a sample illustration, the internet traffic monitoring computer 308 may receive the URL 324 in a file from a first organization. The first organization may identify one or more usernames and/or passwords that may have been compromised based on a data breach of that particular URL 324. In another sample illustration, the internet traffic monitoring computer 308 may receive the URL 324 from querying a database 368 of usernames and/or passwords and identifying the URL 324 as one location where the username and/or password is used to access user data, and a second URL as a second location where the username and/or password is used to access user data for a different organization. The URL 324 may be processed by the URL engine 350 and/or stored with a corresponding database 368. In some embodiments, the URL engine 350 can identify the organization that corresponds with the URL.

The internet traffic monitoring computer 308 may receive a notification and/or alert 326. As a sample illustration, the internet traffic monitoring computer 308 may receive an alert of a data breach at the organization or other internet accessible resource provider 304 from the organization or other internet accessible resource provider 304. The alert 326 may identify the existence of a data breach associated with an organization and/or initial URL. The alert may be processed by the alert engine 356 and/or stored with a corresponding database 368.

In some examples, the internet traffic monitoring computer 308 may passively receive data by monitoring internet traffic. For example, the internet traffic monitoring computer 308 may receive an encryption key associated with a user. When the user transmits encrypted or unencrypted information across a network, the internet traffic monitoring computer 308 may receive or intercept the information, decrypt it if necessary, and determine the information that the user transmitted across the network. The information may include a username and/or password, or one or more URLs associated with organizations that interact with the particular user. The internet traffic monitoring computer 308 can store the username, password, and organization data in a database 368 for later use.

At 340, the internet traffic monitoring computer 308 may determine other potentially compromised data using one or more engines stored on the computer readable medium 314. For example, the internet traffic monitoring computer 308 may comprise a computer readable medium 314 with one or more engines for analyzing and/or processing the received data, including the encryption engine 352, the URL engine 350, username/password engine 354, alert engine 356, risk engine 358, new credential engine 360, and/or two factor authentication engine 362.

The internet traffic monitoring computer 308 may comprise a URL engine 350 configured to receive one or more URLs of organizations. The URLs may correspond with one or more data breaches, usernames, passwords, and/or organizations where data may be compromised. The URL engine 350 may monitor internet traffic from the URL (e.g., as a pass through, as a service for monitoring internet traffic, etc.).

The internet traffic monitoring computer 308 may comprise an encryption engine 352 configured to receive one or more encryption keys from users and/or organizations. The encryption engine 352 may be configured to decrypt incoming or encrypt outgoing internet traffic. In some examples, the encryption engine 352 may also be configured to encrypt a list of usernames and/or passwords stored at database 368 using a different encryption key than what is used by the organization and/or the users.

The internet traffic monitoring computer 308 may comprise a username/password engine 354 configured to match a username/password with other occurrences of the username/password at other organizations and/or URLs (in association with the URL engine 350, etc.). For example, the username "John.Doe@email.com" may be used as a login credential at a URL associated with Acme Co. and also be used as a login credential at a URL associated with Beta Brand. The internet traffic monitoring computer can identify the multiple instances of the username using the username/password engine 354 and identify the URLs that correspond with that username/password using the URL engine 350. The username/password engine 354 may compare the data using information that was obtained actively (e.g., in a file from the organization, etc.) or passively (e.g., by monitoring internet traffic, etc.). In this regard, a database storing username/password combinations from various organizations can be stored in database 368 over periods of time and these records can be searched in the matching performed by the username/password engine 354.

The username/password engine 354 may determine and/or store one or more aliases. For example, a username may correspond with JohnDoe@email.com and aliases of the username may correspond with John.Doe@email.com and JohnnDoee@email.com. The username/password engine 354 may determine whether the username, including each of the aliases of the username, correspond with the same password for different organizations, despite the username being slightly different at each organization. In some examples, the username/password combination and the alias username/password combination may be different (e.g., because the username and the alias username are different, etc.), which may result in not transmitting an alert when the passwords are the same across different organizations.

The internet traffic monitoring computer 308 may comprise an alert engine 356 configured to generate an alert that contains which URLs are associated with the affected username/password. In a sample illustration, the alert engine 356 may receive the alert from the organization or other internet accessible resource provider 304 to notify the internet traffic monitoring computer 308 of the data breach. The alert may comprise a username that has been compromised. In some examples, the alert may comprise a file with a compromised username and an identification of at least the URL associated with an organization at which the compromised username is used. In some embodiments, the URL of the compromised organization (e.g., identified with block 304) and the URL included with the file are different. For example, the URL included in the file may be a top level domain (TLD) or root of a URL (e.g., www.corporation.com, etc.) which may be different than the URL of the compromised organization (e.g., www.corporation.biz, etc.).

The alert engine 356 (optionally working in conjunction with the username/password engine 354) may be configured to determine other internet accessible resource providers that have a matching username as the username and/or password in the alert. The alert engine 356 may determine whether or not the same username and/or password have been compromised at those other internet accessible resource providers. The alert engine 356 may determine that any usernames and/or passwords at other organizations that match the compromised username and/or password at the first organization may be susceptible to a future data breach, even though data at that second organization has not been compromised. The alert engine 356 can generate a second alert to the other internet accessible resource providers regarding the compromised username and/or directing the other internet accessible resource providers to require their users to change usernames and/or passwords or otherwise increase security measures (e.g., two-factor authentication, etc.).

The internet traffic monitoring computer 308 may also comprise a risk engine 358. The risk engine 358 may determine a risk value of a particular username becoming compromised. As a sample illustration, a user may register a username and/or password with a first organization. This organization may employ an untrusted associate that can access the user's account (e.g., a helpdesk operator, an administrator, a website associate that can access an order placed online for goods or services, etc.) and/or steal user's data. The untrusted associate may have a history of compromising usernames of customers that interact with the corporation (e.g., by storing usernames outside of the organization's computer for personal use, etc.). The risk engine 358 may determine that users that interact with this organization and/or the particular untrusted associate have a greater likelihood of becoming a victim of a data breach, for example, by analyzing historical data. The risk value associated with the first organization and/or the username may be increased as a result of the greater likelihood of the data breach from the untrusted associate. By identifying organizations with higher risk values, any usernames and/or passwords that are stored with this organization may be associated with a greater likelihood of the data breach.

When the username/password combination is used by the user at multiple organizations, the untrusted associate may have access to user's data stored at other organizations as well. For example, by stealing "John.Smith@email.com" and "Pa55word" at the first organization, the untrusted associate has the valid username/password combination for a second organization where the user has registered this same username/password to access their data. The risk engine 358 may identify the high risk value associated with the organization that stores the username/password for the user (e.g., as being associated with the untrusted associate, etc.), determine other organizations that have the same or similar username/password for the user, and transmit a notification to the other organizations to identify these organizations of the potential and/or imminent data breach.

The risk engine 358 may determine the risk value by receiving one or more notifications of data breaches and comparing the number of notifications of data breaches for a first type of organization with a number of notifications of data breaches for other types of organizations. When the number of data breaches is higher, the risk value may be increased. The number of notifications of data breaches for the first organization may also be compared with a threshold value (e.g., three data breaches, etc.). As the number of notifications of data breaches increases, the risk value may also increase.

The internet traffic monitoring computer 308 may be configured to determine a risk calculation using the risk engine 358. The determined risk value may be associated with a particular organization, so that when the username and/or password is provided to the particular organization with a high risk value (e.g., a risk value over a predetermined threshold, etc.), the risk engine 358 may identify the potential risk of a data breach associated with that organization, based at least in part on the risk value, even if no particular data breach has occurred. In another example, the risk engine 358 may determine a particular merchant or other internet accessible resource provider 304 may correspond with one or more data breaches in the past. The internet accessible resource provider 308 may correspond with a higher risk than a similar merchant, based on this previous data breach. In either example, the username and/or password that is registered with that risky organization may be assumed to correspond with an imminent data breach.

The computer readable medium 314 may also comprise a new credentials engine 360. As a sample illustration, a user may attempt to register a username and password for a second organization that matches the same username and password that they previously registered with a first organization (e.g., because the internet traffic monitoring computer 308 helps the organization register new users as a web service, because the organization checks with the internet traffic monitoring computer 308 when a user attempts to register new credentials before allowing the user to register, etc.). The new credentials engine 360 may deny any new username/password combinations at the organization that match previously registered username/password combinations at other organizations, where a potential compromise has been indicated or suggested. This can help prevent future data breaches. For example, if a data breach occurs at an organization and the same username/password combination is used at both organizations, then the fraudster that steals the username/password combination from one organization has access to the same combination stored at all other organizations. The fraudster will acquire the same username/password combination at the second organization, even though the fraudster did not access computers associated with that second organization (since the data is identical across more than one organization). By preventing the registration of new credentials that match other credentials that may have been compromised, this type of situation can be prevented.

The user may transmit the request to register by providing the username and/or password to the organization (e.g., username/password 322, etc.), which forwards the request to the new credentials engine 360. This request may attempt to register a username/password for the organization. To identify matching username/password combinations, the new credential engine 360 may compare the existing username/password combinations stored in database 368 with the new username/password that the user is attempting to register.

The new credentials engine 360 may approve or deny the use of the new username/password. When any of these usernames and/or passwords match previously stored usernames and/or passwords, the new credentials engine 360 can identify the match, generate and transmit a notification to the first organization identifying the similarities between the new username and the previously stored usernames and/or denying the request.

As a sample illustration, a user may provide a username to a first organization with an attempt to register their username with the organization (e.g., using an online interface provided by the organization, to establish an online account with the first organization, etc.). The organization may transmit the username and/or password to the internet traffic monitoring computer 308, which is then analyzed by the new credentials engine 360. The new credentials engine 360 can identify other usernames and/or passwords that have been transmitted by other organizations and are stored in the database 368, and compare those previously stored usernames with the received username from the first organization computer. Any identical or substantially similar username/password combinations may be identified. The internet traffic monitoring computer 308 can transmit a notification to identify any similarities and/or deny the attempt to register the new username and/or password with the first organization.

The computer readable medium 314 may also comprise a two-factor authentication engine 362. The two-factor authentication engine 362 may determine whether the usernames and/or passwords are associated with two factor authentication with the organization. In some examples, the two-factor authentication engine 362 may require that, when the user attempts to login to the first organization, the user provides their username and password, and also responds to a secondary message sent to their user device from the first organization. This may confirm that the user knows the username/password combination and may also be in possession of their user device. The usernames and/or passwords that are associated with two-factor authentication may be flagged (e.g., in the database 368, in the list of usernames and passwords from the first organization, etc.). The usernames and/or passwords that are not associated with two-factor authentication may be flagged and/or associated with a higher risk value. In some examples, the two-factor authentication engine 362 may generate a notification to the user and/or organization requesting that the username be associated with two-factor authentication and/or request that the user change the username and/or password more frequently to help prevent a compromise.

At 370, the internet traffic monitoring computer 308 may transmit the alert to the transaction computer 372. For example, the alert may be transmitted to a second organization to identify to the organization that the organization should require users to change their username and/or password as part of a potential data breach at a different organization. In some examples, the alert may be transmitted directly to users to recommend or require that the user change their username and/or password at one or more organizations. In some examples, the alert may be transmitted in an anticipation of a data breach (e.g., a high risk value associated with a restaurant organization, etc.).

In some examples, the internet traffic monitoring computer 308 may transmit the alert to a user's device or account, including via email, text or short message service (SMS) messages, phone, or other methods known in the art. The alert may alternatively be transmitted from the issuer computer, organization computer, or third party computer to the user.

Figure 4:
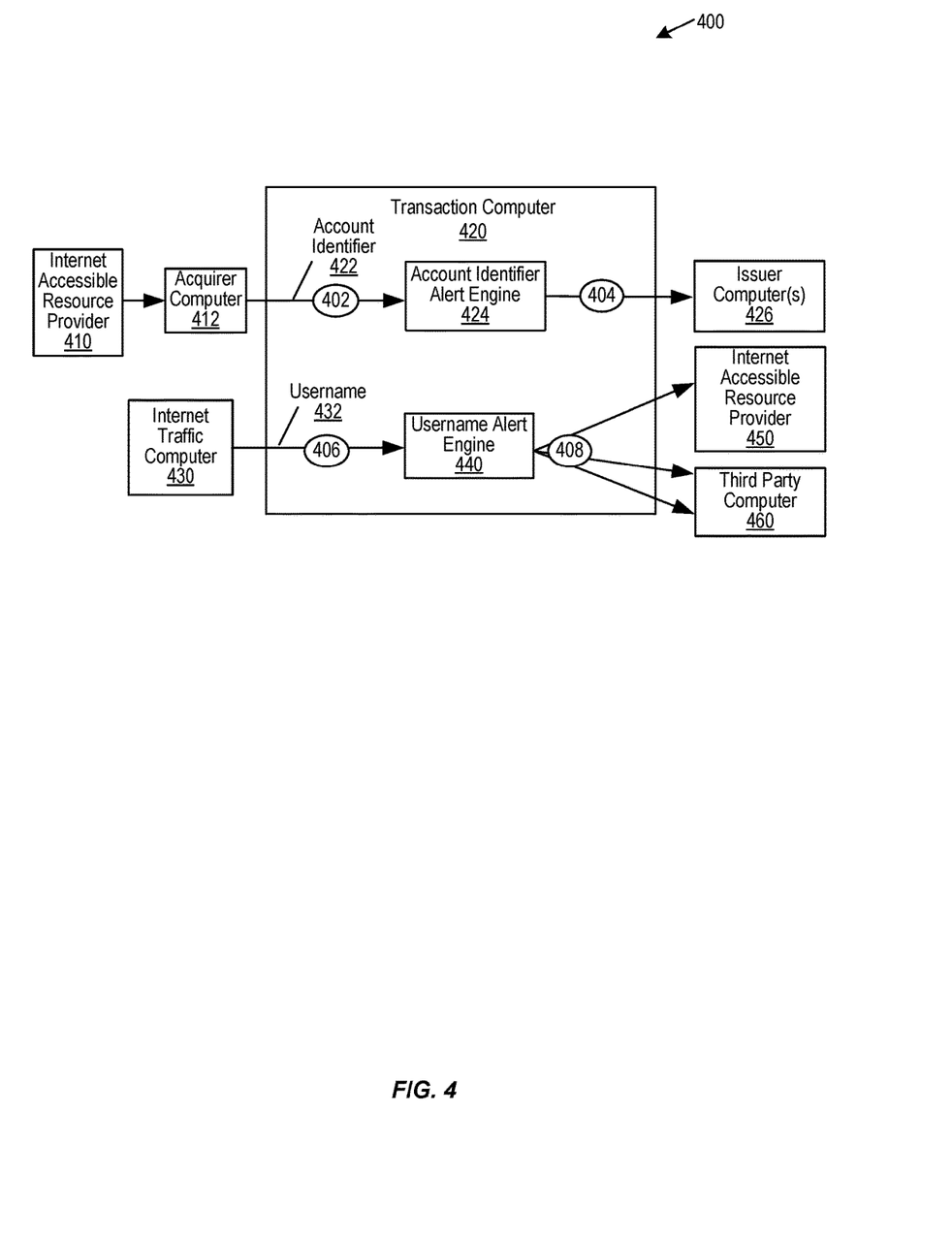
FIG. 4 shows an exemplary block and flow diagram of a transaction computer (TPN), according to another embodiment of the present invention.

FIG. 4 shows an exemplary block and flow diagram of a system 400 including a transaction computer, according to embodiments of the present invention. FIG. 4 illustrates additional details of the transaction computer 130 from FIG. 1. The system 400 comprises an organization or internet accessible resource provider 410, acquirer computer 412, transaction computer 420, issuer computer 426, internet traffic monitoring computer 430, internet accessible resource provider 450, and third party computer 460. As shown in FIG. 4, each of the entities may be in communication with each other.

The entity operating the transaction computer 420 can maintain trust relationships with one or more entities operating the acquirer, issuer, merchant, and/or third party computers (e.g., through one or more transaction processes, etc.). Organization or other internet accessible resource provider 410 (e.g., a merchant platform) may be in communication with an acquirer computer 412. Acquirer computer 412 may be in communication with issuer computer 426 via the transaction computer 420.

An "issuer" may refer to a business entity (e.g., a bank) that maintains financial accounts for a user and often issues a payment identifier such as a credit or debit card to the user. A "merchant," which may be an example of an internet accessible resource provider 410, is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., merchant computer, acquirer computer, transaction computer, and issuer computer) to enable communications, or to perform one or more of the functions described herein.

The transaction computer 420 may include data processing subsystems, networks, and operations used to support and deliver certificate authority services, authorization services, exception file services, transaction scoring services, and clearing and settlement services. An exemplary transaction computer be or form part of a transaction processing network such as VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Other exemplary transaction processing networks may include MasterCard®, Interlink®, Maestro®, Star®, Pulse®, AFFN®, Accel®, CU24®, COOP®, NYCE®, regional networks, etc.

One or more of these computers may be used to conduct payment transactions. For example, a user may provide a username and/or password to an organization or internet accessible resource provider 410 to access a list of goods that are offered by the organization or internet accessible resource provider 410. The organization or internet accessible resource provider 410 may confirm these credentials and allow the user to access and/or order the goods. The user may select one or more goods and provide an account identifier to the organization or internet accessible resource provider 410 to order the goods. The internet accessible resource provider 410 transmits the account identifier and a transaction amount to the acquirer computer 412 in a transaction request. The acquirer computer 412 receives the account identifier 422 from the organization or internet accessible resource provider 410, which can transmit the account identifier and a transaction amount to the transaction computer 420, then to the issuer computer 426. The issuer computer 426 may approve or deny the request to order the goods and transmit a response message back to the transaction computer 420. The transaction computer may forward the response message to the acquirer computer 412, and then to the organization or internet accessible resource provider 410. At a later time, a clearing and settlement process can occur between the acquirer computer 412, the issuer computer 426, and the transaction computer 420.

In some examples, the account identifier may be received by the transaction computer 420 in an authorization request message or an authorization response message.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

In some examples, the account identifier used in the payment transaction may be stolen in a data breach or obtained via phishing (e.g., when the fraudster is disguised as a trustworthy organization to receive the account identifier from the user, etc.), which can also affect usernames and/or passwords as illustrated with FIGS. 1-2. The transaction computer 420 may help determine a data breach and/or alert computers of a potential data breach that affects both the account identifiers (e.g., steps 402 and 404, etc.) as well as the usernames and/or passwords (e.g. steps 406 and 408, etc.).

At 402, the transaction computer 420 may receive an account identifier 422 in an alert associated with a data breach. As a sample illustration, the internet accessible resource provider 410 may have been subjected to a data breach. The internet accessible resource provider 410 may notify other computers of the data breach, including the acquirer computer 412 or the transaction computer 420. In other embodiments, the acquirer computer 412 may be informed of a data breach associated with the account identifier, and may inform the transaction computer 420.

The transaction computer 420 may comprise an account identifier alert engine 424. The alert engine 424 can determine a corresponding issuer computer 426 that provided the account identifier to a particular user. The alert engine 424 determines the issuer associated with the account identifier, and may generate an alert and sent it to the issuer computer 426 that comprises the account identifier 422 to notify the issuer computer 426 that the account identifier 422 has been compromised or associated with a data breach.

At 404, the transaction computer 420 may transmit the alert including the account identifier to the issuer computer 426. The issuer computer 426 can manage a payment account associated with the account identifier included with the alert. When received, the issuer computer 426 may take one or more remedial actions discussed herein.

Steps 406 and 408 may correspond with the flow illustrated in FIG. 1. For example, at 406, the transaction computer may receive a username 432 from an internet traffic monitoring computer 430. The username 432 may be associated with a security breach and/or be "at risk" of being compromised. In some embodiments, the username 432 may be included with a file received by the transaction computer 420.

The transaction computer 420 may comprise a username alert engine 440. The file may include the username and/or identification of at least one organization computer that is not involved with the initial security breach. In some examples, the username alert engine 440 can determine the corresponding organization, as discussed with FIG. 1.

At 408, the transaction computer 420 may generate an alert that includes the username associated with different URLs and transmit the alert to one or more organizations, including an issuer computer 426, organization or internet accessible resource provider 450, or third party computer 460. The alert may include the username that is involved with the security breach. When received, the issuer computer 426, organization or internet accessible resource provider 450, or third party computer 460 may take one or more remedial actions discussed herein.

The various participants and elements described herein may operate one or more computer apparatuses to facilitate the functions described herein. Any of the elements in the above-described computers and devices, including any servers or databases, may use any suitable number of subsystems to facilitate the functions described herein.

Examples of such subsystems or components are described herein. Subsystems within the computers or devices may be interconnected via a system bus. Additional subsystems such as a printer, keyboard, fixed disk (or other memory comprising computer readable media), monitor, which may be coupled to display adapter, and others may be implemented. Peripherals and input/output (I/O) devices, which couple to I/O controller (which can be a processor or other suitable controller), can be connected to the computer system by any number of means known in the art, such as serial port. For example, serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a first computer from an internet traffic monitoring computer, a decrypted username associated with a data breach at a first organization, wherein the internet traffic monitoring computer performed steps including:
      receiving an encrypted username from a transaction computer, issuer computer, organization or other internet accessible resource provider, or third party computer,
      decrypting the encrypted username to generate the decrypted username, and
      transmitting the decrypted username to the first computer;
   comparing, by the first computer, the decrypted username with previously received usernames from a plurality of organizations;
   identifying, by the first computer, a second organization from the plurality of organizations at which the decrypted username is used;
   encrypting, by the first computer, an alert using an encryption key; and
   transmitting, by the first computer, the encrypted alert to a second computer associated with the second organization, the encrypted alert comprising the decrypted username, and the encrypted alert indicating that the decrypted username used at the second organization has been compromised for enhancing data security at the second organization.

2. The method of claim 1, wherein the first organization and the second organization are internet accessible resource providers.

3. The method of claim 1, wherein the first computer monitors internet traffic to determine the encrypted username.

4. The method of claim 1, further comprising:
storing, by the first computer, one or more decryption keys associated with the first organization; and
using the one or more decryption keys to determine the decrypted username associated with the data breach at the first organization.

5. The method of claim 1, wherein an identity of the second organization is received by the first computer from the first organization.

6. The method of claim 1, wherein the at least some of the previously received usernames are identified passively in internet traffic from the first organization.

7. The method of claim 1, wherein at least some of the previously received usernames are actively received from the first organization in a list of usernames from the first organization.

8. The method of claim 1, further comprising:
storing the decrypted username with the previously received usernames from the plurality of organizations.

9. The method of claim 8, further comprising:
receiving a second indication relating to an attempt to register a new username;
comparing the new username with the previously received usernames; and
when the new username exists with the previously received usernames, transmitting a second alert to deny registration of the new username.

10. The method of claim 1, wherein the first computer is a transaction processor that performs authorization services for at least one issuer computer.

11. The method of claim 1, further comprising:
receiving, by the first computer and from an acquirer computer, a transaction amount; and
transmitting, by the first computer and to a second issuer computer, the transaction amount.

12. A computing system comprising:
a processor;
a computer readable medium for performing a method comprising:
receiving, from an internet traffic monitoring computer, a decrypted username associated with a data breach at a first organization, wherein the internet traffic monitoring computer performed steps including:
receiving an encrypted username from a transaction computer, issuer computer, organization or other internet accessible resource provider, or third party computer,
decrypting the encrypted username to generate the decrypted username, and
transmitting the decrypted username;
comparing the decrypted username with previously received usernames from a plurality of organizations;
identifying a second organization from the plurality of organizations at which the decrypted username is used;
encrypting an alert using an encryption key; and
transmitting the encrypted alert to a second computer associated with the second organization, and the encrypted alert comprising the decrypted username, the encrypted alert indicating that the decrypted username used at the second organization has been compromised for enhancing data security at the second organization.

13. The computing system of claim 12, wherein the first organization and the second organization are internet accessible resource providers.

14. The computing system of claim 12, further comprising: monitoring internet traffic to determine the encrypted username.

15. The computing system of claim 12, further comprising:
storing one or more decryption keys associated with the first organization; and
using the one or more decryption keys to determine the decrypted username associated with the data breach at the first organization.

16. The computing system of claim 12, wherein an identity of the second organization is received from the first organization.

17. The computing system of claim 12, wherein the at least some of the previously received usernames are identified passively in internet traffic from the first organization.

18. The computing system of claim 12, wherein at least some of the previously received usernames are actively received from the first organization in a list of usernames from the first organization.

19. The computing system of claim 12, wherein the method further comprises:
storing the decrypted username with the previously received usernames from the plurality of organizations.

20. The computing system of claim 19, wherein the method further comprises:
receiving a second indication relating to an attempt to register a new username;
comparing the new username with the previously received usernames; and
when the new username exists with the previously received usernames, transmitting a second alert to deny registration of the new username.

* * * * *